(12) United States Patent
Scheidiger et al.

(10) Patent No.: US 11,731,212 B2
(45) Date of Patent: Aug. 22, 2023

(54) OPTICAL UNIT FOR LASER MACHINING OF A WORKPIECE AND LASER MACHINING DEVICE (71) Applicant: Bystronic Laser AG, Niederönz (CH)

(72) Inventors: Simon Scheidiger, Langenthal (CH); Martin Mumenthaler, Rohrbach (CH); Andreas Luedi, Burgdorf (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/787,294

(22) PCT Filed: Dec. 22, 2020

(86) PCT No.: PCT/EP2020/087640
§ 371 (c)(1),
(2) Date: Jun. 18, 2022

(87) PCT Pub. No.: WO2021/130230
PCT Pub. Date: Jul. 1, 2021

(65) Prior Publication Data
US 2023/0013251 A1 Jan. 19, 2023

(30) Foreign Application Priority Data
Dec. 23, 2019 (EP) .................................. 19219258.1

(51) Int. Cl.
*B23K 26/06* (2014.01)
*B23K 26/36* (2014.01)

(52) U.S. Cl.
CPC .......... *B23K 26/0648* (2013.01); *B23K 26/36* (2013.01)

(58) Field of Classification Search
CPC .... B23K 26/36; B23K 26/1476; B23K 26/38; B23K 26/21; B23K 26/0648; G02B 1/02
See application file for complete search history.

(56) References Cited

U.S. PATENT DOCUMENTS 11,077,520 B1 * 8/2021 Rudolf ................. B23K 26/064

FOREIGN PATENT DOCUMENTS

| DE | 10 2007 048 617 A1 | 4/2009 |
| EP | 2 216 129 A1 | 8/2010 |
| EP | 2 511 040 A1 | 10/2012 |
| WO | WO 2019/082114 A1 | 5/2016 |

(Continued)

OTHER PUBLICATIONS

Translation of DE 10 2007 048 617 A1, 2007.
(Continued)

*Primary Examiner* — Brian W Jennison
(74) *Attorney, Agent, or Firm* — Jacob Eisenberg (57) ABSTRACT An optical unit fora laser beam for laser machining of a workpiece is disclosed. With particular application to a laser beam, the optical unit may be applied to a high-power laser beam and comprise an optical element for the optical imaging of the laser beam, and two protective glasses that are transparent for the laser beam, the outer edges of which protective glasses being enclosed in an airtight manner by a holder in such a way that they form an interior space with the holder, the optical element also being arranged in the interior space. A laser machining device is also disclosed.

14 Claims, 6 Drawing Sheets (56) References Cited

FOREIGN PATENT DOCUMENTS

WO    WO 2019/034397 A1    2/2019

OTHER PUBLICATIONS

Translation of EP 2 216 129 A1, 2010.
Translation of EP 2 511 040 A1, 2012.
Translation of WO 2019/034397 A1, 2019.
Submission of Amendments under Article 19 PCT, dated Jun. 23, 2012, during prosecution of PCT/EP2020/087640 before the European Patent Office.

* cited by examiner

OPTICAL UNIT FOR LASER MACHINING OF A WORKPIECE AND LASER MACHINING DEVICE

CROSS REFERENCE TO RELATED APPLICATIONS

This application is a national phase application of International Application No.: PCT/EP2020/087640, filed on Dec. 22, 2020, and further claims priority to European patent application 19219258.1, filed on Dec. 23, 2019, the content of both of which is incorporated herein by reference.

BACKGROUND OF THE INVENTION

Field of the Invention

The present invention relates to an optical unit for a laser beam for laser machining of a workpiece, a laser machining device and a use of an optical unit or a laser machining device.

Description of Related Art

Laser machining devices are used in the laser machining of workpieces, in particular in methods for the thermal separation of materials by means of laser radiation, such as laser cutting. A machining laser beam is guided onto the workpiece, for example onto a sheet metal to be machined. This is typically done by optical imaging of the laser beam onto the workpiece to be machined using one or more optical elements. In this context, optical imaging is understood to mean that the laser beam is guided onto the workpiece, for example by refraction, reflection, diffraction and/or beam shaping.

Typically, optical elements made of quartz glass (fused silica, FS), such as lenses, are used for high-power laser machining. An optical element made of quartz glass only absorbs laser power to a small extent, hardly heats up, can be coated very well, has very good imaging properties and is comparatively inexpensive. The disadvantage of quartz glass optical elements, however, is that they are very sensitive to dirt. If there is a small amount of contamination on the optical element, it heats up due to the laser power and the heat generated cannot be dissipated sufficiently since quartz glass hardly conducts heat. Quartz glass optical elements that are used for high-power laser machining can therefore be damaged by adhering contamination, for example dirt particles or moisture, and/or their imaging properties can be impaired. This is disadvantageous in particular in the case of high-power laser applications in an industrial environment. Since the industrial environment in high-power laser applications, in particular when cutting and welding metals, is usually associated with high levels of soiling, it is advantageous to take into account the sensitivity of the components used to dirt. For example, in the case of a focusing lens made of quartz, the local heating in the region of contamination can induce an undesired focus shift, i.e. a shift of the focus in the direction of propagation and/or at an angle to the direction of propagation of the laser beam. Laser machining systems often fail due to quartz glass optical elements that are (even very slightly) soiled. EP 2511040 A1 describes a cassette for holding an optical element in a laser machining head with a transparent protective device.

An alternative material for high-power laser optical elements is zinc sulfide (ZnS). ZnS has good thermal conductivity. However, the material is not only expensive, but also typically crystalline and anisotropic, and has a comparatively high laser absorption and a forward scattering of approximately 2-3%. This means that 2-3% of the applied laser power is not imaged, e.g. focused, as intended. Rather, 2-3% of the laser power is scattered forwards in an uncontrolled manner in a more or less large scatter cone. The consequence of this is that the surroundings around the ZnS optical element, e.g. optical element holders or entire laser machining heads, is heated up. The laser machining process can also be adversely affected due to the scattered light.

Sapphire has been suggested as another material for high-power laser optical elements. This material scatters less than ZnS (but more than FS) and has acceptable thermal conductivity, so minor soiling does not immediately lead to failure of the optical element or of the laser machining system. However, sapphire is expensive and difficult to process (e.g. grind, polish) due to its high level of hardness. When manufacturing curved optical elements made of sapphire, there are also restrictions in terms of shape (e.g. edge thickness, curvature radii).

Sapphire also has the disadvantage that the material is anisotropic and has birefringence. As a result, light is imaged differently depending on the polarisation through curved optical elements made of sapphire. Since a laser beam in most cases (in particular with high-power lasers) has different or random polarisations, this birefringence leads to imaging errors (astigmatism).

BRIEF SUMMARY OF THE INVENTION

The object of the invention is to provide an optical unit with low sensitivity to surface contamination and good imaging properties.

The optical unit is thus designed as a composite optical system, with transparent protective glasses and an optical element. Since the optical element is arranged in the airtight interior space, which is formed by the protective glasses and the holder, the surfaces of the optical element are protected from undesired contamination with dust and dirt particles, moisture and gases. When a laser beam, in particular a high-power laser beam, impinges on the optical element, it is therefore not heated by surface contamination. Damage to the optical element is therefore avoided even in long-term and/or high-power laser applications and the imaging properties of the optical element is not impaired. In particular, forward scattering and birefringence can be avoided by the optical unit.

In an embodiment, the invention relates to an optical unit for a laser beam for laser machining of a workpiece, in particular for a high-power laser beam, comprising an optical element for the optical imaging of the laser beam, and two protective glasses that are transparent for the laser beam, the outer edges of which are enclosed in an airtight manner by a holder in such a way that they form an interior space with the holder, the optical element being arranged in the interior space.

The optical element can have a thermal conductivity of less than or equal to 2 W/(m K). The optical element can further contain or be formed from at least one material selected from quartz glass and calcium fluoride. Since the optical element has a low thermal conductivity, but is protected from surface contamination, damage to the optical element during laser irradiation is avoided.

At least one of the protective glasses can have a thermal conductivity greater than or equal to 10 W/(m K). At least one of the protective glasses can also contain or be formed from at least one material selected from sapphire and zinc sulfide. The optical imaging of the laser beam can be effected by the optical element and not by the protective glasses. Therefore, forward scattering and birefringence can be avoided even when using protective glasses with a thermal conductivity greater than or equal to 10 W/(m K) and/or with the aforementioned materials sapphire and zinc sulfide. At the same time, the protective glasses of this type are comparatively insensitive to surface contamination and/or comparatively robust to surface contamination, e.g. compared to FS. In all embodiments, at least one of the protective glasses and/or the optical element can be formed from high-purity optical materials.

A clean room atmosphere, an inert gas, a vacuum and/or a non condensing atmosphere can be provided in the interior space formed by the protective glasses and the holder. Nitrogen or a noble gas such as argon can be used as the inert gas. The non condensing atmosphere can, for example, have an absolute humidity of less than or equal to 0.2 g/m<3>. These measures enable an additional minimisation of surface contamination of the optical element.

The optical element can be arranged between the protective glasses and/or in the beam path of the laser beam between the protective glasses. The optical unit can thus be designed in such a way that the laser beam impinges, for example, both on the protective glasses as well as on the optical element substantially perpendicularly. Alternatively, the optical element can be designed, for example, as a reflecting mirror on which the laser beam impinges at an angle to the perpendicular, while it impinges on the protective glasses substantially perpendicularly. Additionally or alternatively, the optical element can be arranged adjacent to and/or spaced apart from at least one of the protective glasses. For example, no further element is arranged between the optical element and the adjacent protective glass or glasses. If the optical element is at a distance from at least one of the protective glasses, contact between them is also avoided. The optical element and the protective glasses can also form a sandwich structure. The optical element and/or the protective glasses can also be fastened or attached to the holder. The aforementioned embodiments of the optical unit enable a compact and space saving configuration of the optical unit.

In the optical unit of embodiments, at least one of the protective glasses can be designed as a substantially plane-parallel plate. Flat protective glasses can advantageously be manufactured inexpensively. Furthermore, the protective glasses can be arranged substantially parallel to one another. The protective glasses and a plane of the optical element which is oriented substantially perpendicular to an optical axis of the optical element and/or to a direction of propagation of the laser beam can be arranged substantially parallel to one another. These embodiments of the optical unit also enable a compact and space saving configuration of the optical unit with a simultaneous low sensitivity to surface contamination and good imaging properties for the laser beam.

In embodiments of the optical unit, the protective glasses can be fastened or attached to the holder with an optical adhesive and/or with a screw connection. Furthermore, the optical element can be fastened or attached to the holder with an optical adhesive and/or with a screw connection. These configurations enable the optical unit and/or the protective glasses to be connected to the holder.

In further embodiments of the optical unit, the holder can be provided with a cooling means, in particular with internal cooling channels. This enables the holder and thus also the optical element and/or the protective glasses to be cooled during use during laser machining. This also holds for embodiments, in which the optical element is arranged between the protective glasses and/or in the beam path of the laser beam between the protective glasses, and/or in which the optical element and the protective glasses form a sandwich structure.

The optical element can be designed for the optical imaging of the laser beam such that it is at least partially reflective for the laser beam, at least partially transmissive for the laser beam, sets a focal length for the laser beam, guides the laser beam, deflects the laser beam and/or shapes the laser beam. Alternatively or additionally, at least one of the protective glasses can be designed in such a way that it does not substantially change the optical properties of the laser beam. It is not only the desired optical imaging of the laser beam that can be achieved with these embodiments individually or in combination. The optical imaging of the laser beam can also be effected by the optical element and not by the protective glasses. Therefore, even when using protective glasses with a thermal conductivity greater than or equal to 10 W/(m K) and/or containing sapphire and/or zinc sulfide, forward scattering and birefringence can be avoided. At the same time, the protective glasses of this type are comparatively insensitive to surface contamination.

In embodiments of the optical unit, the optical unit and/or the holder can be designed in such a way that thermal expansion of at least one component of the optical unit is tolerated, in particular tolerated in an airtight manner, wherein the component is selected from one or two of the protective glasses, the optical element, the holder, the optical adhesive, the screw connection, the cooling means, an atmosphere in the interior space and/or a gas in the interior space. By tolerating the thermal expansion of the at least one component, a resulting enlargement of the component can be tolerated without damaging one or more components of the optical unit. Even if the optical element and/or another component of the optical unit expands as a result of heating, in particular a radial play of the optical element can be provided in this way so that it does not become warped in the optical unit and/or in the holder. For example, an optical adhesive and/or a holder can be used which, due to the modulus of elasticity of their material, have sufficient elasticity that can at least partially absorb the thermal expansion of the optical system. The adhesive can have a modulus of elasticity of 100 to 500 MPa, preferably 150 to 250 MPa, more preferably 180 to 220 MPa. In the case of a screw connection, the thermal expansion of at least one component of the optical unit can be tolerated in that the protective glasses 14 and/or the optical element 12 lie on the inner wall of the holder 16 or on at least one easily deformable mount, for example an inner ring, and a have radial play.

In embodiments of the optical unit, at least one first means for monitoring the optical, thermal and/or mechanical properties of at least one of the protective glasses and/or the optical element can be provided. In some embodiments, any soiling on the protective glasses and/or on the optical element can substantially be monitored.

Soiling and/or particles and/or drops of moisture on the protective glasses and/or on the optical element typically cause scattered light by scattering the laser beam. According to embodiments, this scattered light can be detected with at least one photodiode (PD). For example, the protective glasses and/or the optical element can be monitored with at least one photodiode provided on the side of the optical unit. The at least one photodiode can be part of the optical unit, for example it can be provided on the outside of the holder of the optical unit. Alternatively, a transparent hole can be provided laterally in the holder. Thus, with at least one photodiode, which is a part of the optical unit or is provided separately, the outer and/or inner surface of the protective glass and/or of the optical element can be monitored in a lateral plan view through the transparent hole.

In addition, a thermal sensor, for example PtlOO, can be provided with which the temperature, for example of the holder of the optical unit, is monitored. For this purpose, a contact between the thermal sensor and the monitored component of the optical unit can be provided such that the thermal sensor is at least partially part of the optical unit. Thermal sensors are also alternatively called temperature sensors.

Furthermore, optical detectors can be provided which detect thermal radiation emanating from a component to be monitored (for example thermopiles). The optical detectors can be at least partially part of the optical unit. Such detectors can also be provided separately from the optical unit.

In one embodiment, the invention relates to a laser machining device, in particular a laser machining head, having an interface for a laser source for generating a laser beam; and an optical unit according to one of the preceding embodiments, wherein the optical unit is arranged in the beam path of the laser beam. The advantages and effects mentioned for the optical unit can thus be achieved in a laser machining device.

In embodiments of the laser machining device, a cooling device can be provided which is coupled to the cooling means, in particular to the cooling channels, of the holder. Additionally or alternatively, the interface can be coupled or provided with a laser source which provides the laser beam with a power greater than or equal to 6 kW, preferably greater than or equal to 10 kW.

The laser machining device can furthermore have at least one second means for monitoring the optical, thermal and/or mechanical properties of at least one of the protective glasses and/or the optical element. For example, at least one photodiode above and/or below the optical unit can be attached separately therefrom in the laser machining device. The surface of the component to be monitored, for example the optical unit and/or one or both protective glasses, can be observed with the at least one photodiode. Furthermore, a thermal sensor can be provided in the laser machining device, with which the temperature, for example of the holder of the optical unit, is monitored. For this purpose, the thermal sensor can be in contact with the monitored component of the optical unit. Furthermore, optical detectors can be provided in the laser machining device, which detect thermal radiation emanating from a component to be monitored (for example thermopiles). Such detectors can be provided separately from the optical unit. A resistance temperature sensor, also called RTD (resistance temperature detector), in particular PtlOO as a platinum resistance temperature sensor with a nominal resistance of 100 ohms, can be used as the thermal sensor.

With the laser machining device of the above embodiments, the same advantages, operating modes and functions can be realised as with the embodiments of the optical unit, in particular with identical and/or analogous features.

In particular, embodiments of the optical unit, in which the optical element contains or is formed from at least one material selected from quartz glass and calcium fluoride, and/or in which at least one of the protective glasses contains or is formed from at least one material selected from sapphire and zinc sulfide and/or is designed as a substantially plane-parallel plate, can provide for advantages mentioned herein while avoiding undesired effects. For instance, using at least one protective glass containing or being formed from at least one material selected from sapphire and zinc sulfide and being designed as a plane-parallel plate, forward scattering and/or birefringence can be decisively reduced or avoided. This particularly holds compared to a curved element of the same material (s).

In one embodiment, the invention relates to a use of an optical unit according to one of the preceding embodiments or a laser machining device according to one of the preceding embodiments for laser machining of a workpiece, in particular for high-power laser machining. In this way, the advantages and effects mentioned for the optical unit can be achieved in the context of laser machining of a workpiece. In particular, the optical unit can be used for laser cutting or for laser welding, in each case using, for example, a high-power laser with a wavelength of approximately 1 pm (fibre laser, disk laser).

Further features and advantages arise from the following description of embodiments, the figures and the dependent claims.

BRIEF DESCRIPTION OF THE SEVERAL VIEWS OF THE DRAWINGS

All non-mutually exclusive features of embodiments described here can be combined with one another. The same elements of the embodiments are given the same reference signs in the following description. Individual or a plurality of elements of one embodiment can be used in the other embodiments without further mention. Embodiments of the invention are now described in more detail using the following examples with reference to figures, without intending any limitation thereby. In the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

The optical unit and/or machining device according to the embodiments of the invention are described below, inter alia, by way of examples with a machining head (also called a laser machining head), without limiting the invention thereto. The optical unit can be provided, for example, in a laser welding head or in a laser cutting head.

The term "airtight" in the present case includes the terms "gas-tight" and/or "dust-tight". The term "transparent protective glass" and modifications thereof denote a transparent optical window which, apart from absorption, allows a laser beam that impinges perpendicularly in particular, to pass through substantially optically unchanged. Perpendicular impingement of the laser beam on an element means in embodiments that the laser beam with its direction of propagation and/or optical axis impinges the relevant element, for example protective glass, substantially perpendicularly. The terms "laser beam" and "machining laser beam" are used synonymously. The terms "laser machining device" and "machining device" are also used synonymously. The terms "quartz glass" and "quartz" are used synonymously. The unit W/(m K) of the thermal conductivity used herein is to be understood as W/(m×K).

Furthermore, where value ranges are described here, the specification of a broad range with narrower alternative or preferred ranges is also considered to disclose ranges that may be formed by any combination of specified lower range limits and specified upper range limits.

Figure 1:
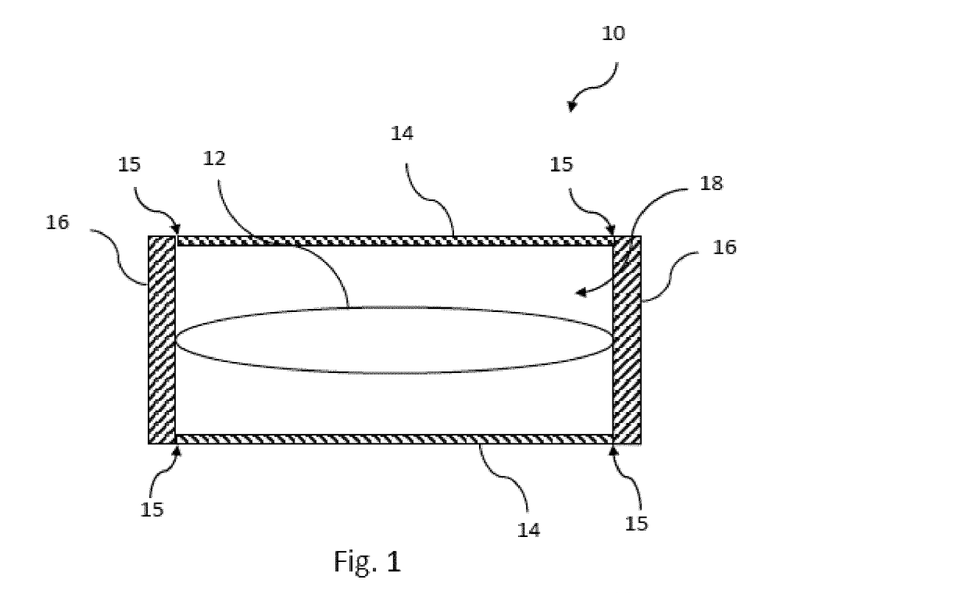
FIG. 1 schematically shows an example of an optical unit 10 for a laser beam for laser machining of a workpiece, according to embodiments of the invention.

FIG. 1 schematically illustrates an example of an optical unit 10 for a laser beam for laser machining of a workpiece, according to embodiments. FIG. 1 shows a lateral cross-sectional view of the optical unit 10.

The optical unit 10 has a focusing lens 12 as an optical element for the optical imaging of a laser beam. The focusing lens 12 is only shown schematically in the figures. Furthermore, two protective glasses 14 that are transparent to the laser beam are provided, between which the focusing lens 12 is arranged. The protective glasses 14 have peripheral outer edges 15. The latter are substantially enclosed, in an airtight manner, by a holder 16. The protective glasses 14 form, with the holder, an interior space 17 in which the optical element 12 is arranged.

In the present example, the focusing lens 12, the protective glasses 14 and the holder 16 are designed to be circularly symmetrical or rotationally symmetrical in a cross-sectional plane (not shown) perpendicular to the plane of the figure. The material of the focusing lens 12 is high-purity quartz glass (fused silica, FS, SiC>2) and has a thermal conductivity of approximately 1.38 W/(m K). The focusing lens 12 is approximately 5.00 cm in diameter. The protective glasses 14 are made of high-purity sapphire (Al2O3) and have a thermal conductivity of approximately 27.2 W/(m K). The protective glasses 14 are approximately 3 mm thick in the present example and have a diameter of approximately 5.00 cm. In other examples, the protective glasses 14 can be approximately 1 to 3 mm thick. The holder 16 is ring-shaped, approximately 6 mm thick, has an inner diameter of approximately 5.00 cm, a height of approximately 2 cm and is made from the aluminium alloy AlMg4.sMno.7. The protective glasses 14 and the focusing lens 12 are attached to the holder 16, for example with a screw connection.

The optical imaging takes place with the focusing lens 12 made of quartz glass, while the protective glasses 14 made of sapphire and the holder 16 protect the focusing lens 12 from contamination. The protective glasses 14 do not produce any optical imaging of the laser beam. Forward scattering and birefringence are therefore avoided with the optical unit 10, while the sensitivity of the focusing lens 12 to contamination, moisture and dirt is minimised. Focusing lenses made of quartz and protective glasses made of sapphire are also readily available. The same applies to protective glasses made of zinc sulfide, which can be used as an alternative. Overall, due to the construction of the optical unit 10, its imaging properties, in particular with respect to aberration, the absorption of the laser beam, its sensitivity to dirt, the forward scattering and birefringence of the laser beam caused by the optical unit, as well as its manufacturability and manufacturing costs are optimised.

Figure 2:
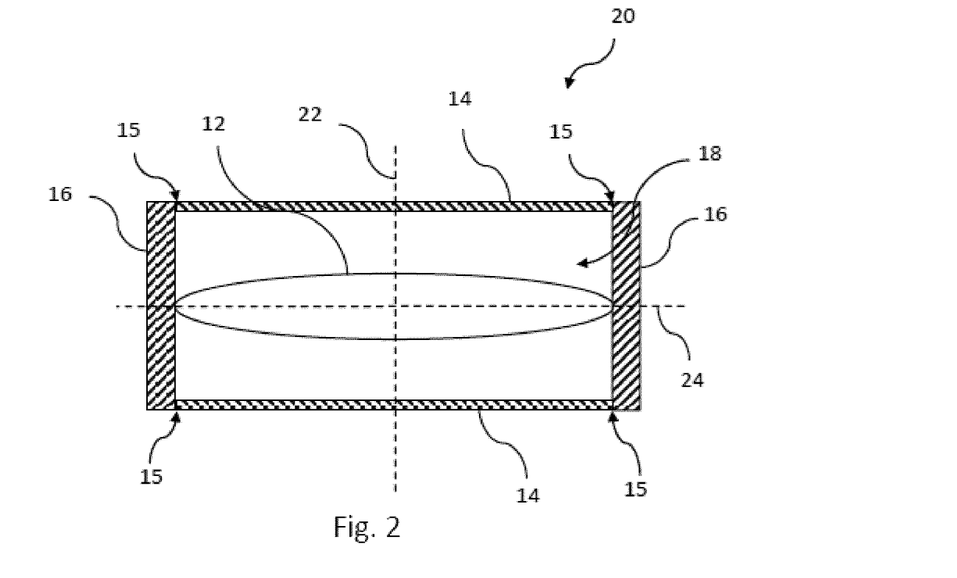
FIG. 2 schematically shows an example of an optical unit 20 for a laser beam for laser machining a workpiece, in a lateral cross-sectional view, according to embodiments of the invention.

FIG. 2 schematically shows an example of an optical unit 20 for a laser beam for laser machining of a workpiece, in a lateral cross-sectional view.

In contrast to the optical unit 10 of FIG. 1, the optical unit 20 contains a clean room atmosphere in the interior space 17. Both protective glasses 14 are each designed as a substantially plane-parallel plate and are arranged parallel to one another. The protective glasses 14 and a plane 24 of the optical element 20, which is oriented perpendicular to an optical axis 22 of the optical element 20, are arranged parallel to one another. The optical unit is designed in such a way that a laser beam to be focused can, for example, impinge both on the protective glasses 14 and on the optical element 20 substantially perpendicularly. The optical element 20 is arranged adjacent to and spaced apart from the protective glasses 14. The optical element 20 and the protective glasses 14 form a sandwich structure. The aforementioned embodiments of the optical unit 20 thus enable a compact and space-saving configuration of the optical unit.

Figure 3A:
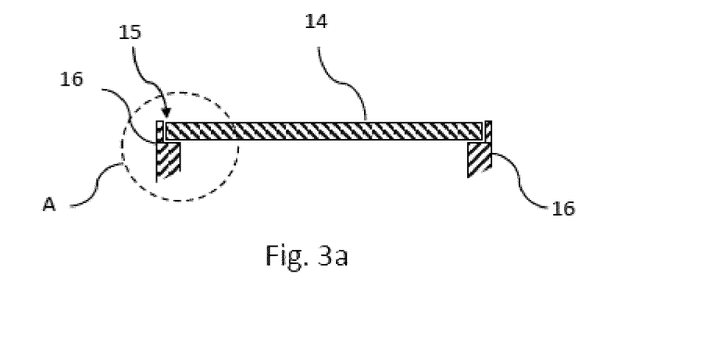
FIGS. 3*a* and 3*b* schematically show, by way of example, a detail of the optical unit for a laser beam for laser machining of a workpiece, in a lateral cross-sectional view, according to embodiments of the invention.
Figure 3B:
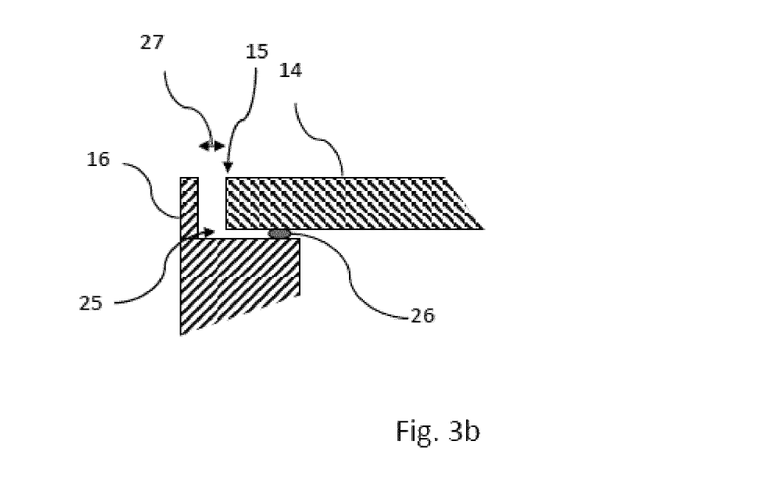

FIGS. 3a and 3b show, by way of example, a connection point between the holder 16 and one of the protective glasses 14. FIG. 3b shows an enlargement of the circular section A shown in FIG. 3a. The holder 16 has a recess 25 at both ends. In the present example, the protective glasses 14 have a diameter of approximately 5.30 cm, while the holder has an inner diameter of approximately 5.00 cm. As illustrated in FIGS. 3a and 3b, the protective glass 14 rests in the recess 25 on the holder 16 and is fastened to the holder 16 at the support point by means of an optical adhesive 26. The protective glass 14 is arranged laterally, i.e. with its peripheral outer edge 15 at a distance from the holder 16, which is identified in FIG. 3b by the double arrow 27.

A commercially available adhesive which is suitable for laser beam applications and has a modulus of elasticity of less than 500 MPa can be selected as the optical adhesive 26. In the present example, the optical adhesive 26 has a modulus of elasticity of approximately 200 MPa, while the holder 16 made of aluminium has a modulus of elasticity of approximately 70 GPa. For examples in which sapphire or ZnS is used as the material for the protective glasses 14, the modulus of elasticity of sapphire can be approximately 345 GPa and the modulus of elasticity of ZnS can be approximately 88 GPa.

Due to the elastic properties of the holder 16 and the optical adhesive 26, as well as the spatial configuration of the optical unit 20, the protective glass 14 has a radial play within the holder 16. During irradiation of the optical unit 20 with a laser beam, in particular a high-power laser beam, the thermal expansion of the holder 16, the protective glass 14 and the optical adhesive 26 is tolerated in such a way that the substantially airtight connection between the protective glass 14 and the holder 16 is maintained.

Similarly, in a further example, the optical element 12 is attached to the holder 16 in a recess or on a projection of the holder 16 with an optical adhesive. The optical element 12 can also be attached to the holder 16 in a substantially airtight manner.

Alternatively or additionally, in the optical unit of embodiments, at least one protective glass 14 and/or the optical element 12 can be attached to the holder 16 in each case by means of a screw connection and/or a mount 28. The mount 28 for the protective glass 14 and/or the mount 28 for the optical element 12 can be screwed, clamped and/or adhesively bonded into the holder 16. The mount 28 can be easily deformed.

Figure 3C:
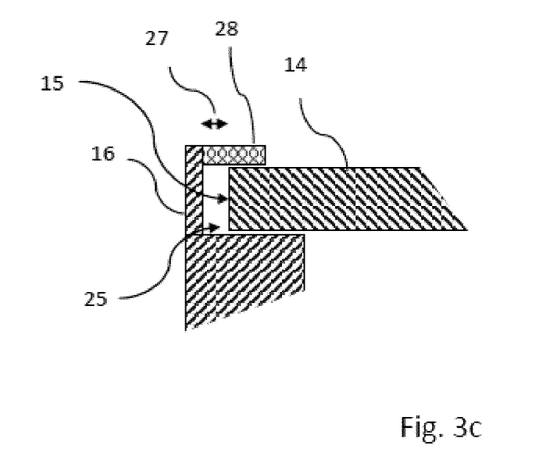
FIGS. 3*c* and 3*d* schematically show, by way of example, a detail of the optical unit for a laser beam for laser machining of a workpiece, in a lateral cross-sectional view, according to embodiments of the invention.

For example, as shown in FIG. 3c, the protective glass 14 is provided on the inner wall of the holder 16 in the recess 25 and is held in the recess 25 by an inner ring or O-ring as a mount 28. The mount 28 is easily deformable due to its spatial structure and/or its material suitable for laser applications. The mount or the inner ring 28 can be formed, for example, from stainless steel or from an aluminium alloy, for example AlMg4.5Mno.7. The side of the protective glass 14 is arranged with its outer edge 15 at a distance 27 from the holder 16 and has a radial play. The inner ring 28 has a thread (not shown) with which it is screwed into an internal thread (not shown) of the holder 16 in a substantially airtight manner. The protective glass 14 lies against or on the deformable inner ring 28. The protective glass 14 is thus attached to the holder 16 in a substantially airtight manner.

Figure 3D:
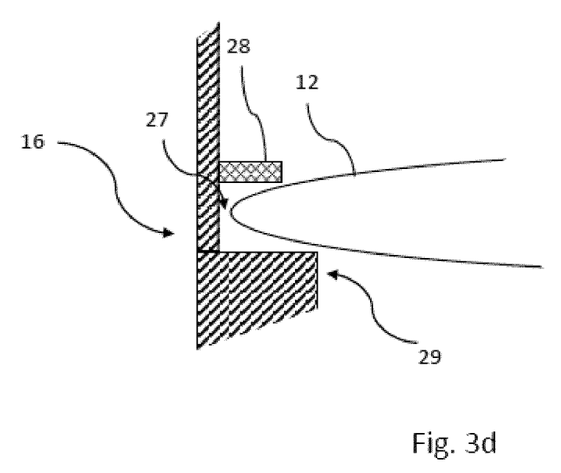

Analogously, in a further example, the optical element 12 is attached between a projection 29 of the holder 16 and an inner ring as a mount 28 on the holder 16, as shown in FIG. 3d. The optical element 12 can also be attached to the holder 16 in a substantially airtight manner.

In the examples of FIGS. 3c and 3d, the mount 28 can, in addition or as an alternative to the screw connection, be clamped into the holder 16 and/or adhesively bonded in with an optical adhesive.

Thermal expansion of one or both protective glasses 14, the optical element 12, the mount 28 and/or the holder 16 can be tolerated during a screw connection, while their connections, in particular their substantially airtight connections, are maintained.

Figure 4:
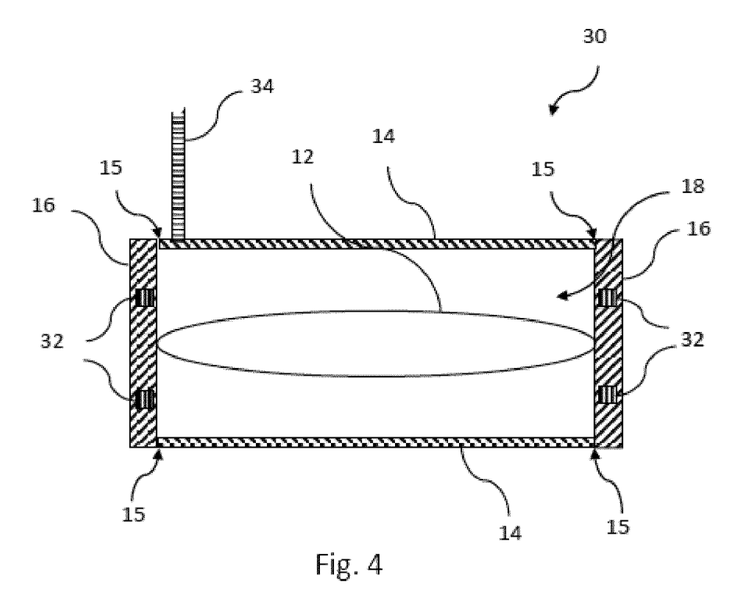
FIG. 4 schematically shows a further example of an optical unit 30 according to embodiments of the invention.

As a further example, FIG. 4 shows an optical unit 30 according to embodiments. In contrast to the optical units 10 and 20, the optical unit 30 has a cooling means with cooling channels 32 which are provided in the holder 16. During laser machining, a cooling fluid, for example water or liquid nitrogen, can flow through the cooling channels 32 and thus cool the optical unit 30.

The optical unit 30 is also provided with a thermal sensor 34, which is connected to one of the protective glasses 14 in a thermally conductive manner. The thermal sensor 34 can be implemented with a Pt1OO, for example, and serves as the first means for monitoring the thermal properties of the protective glass 14.

Figure 5:
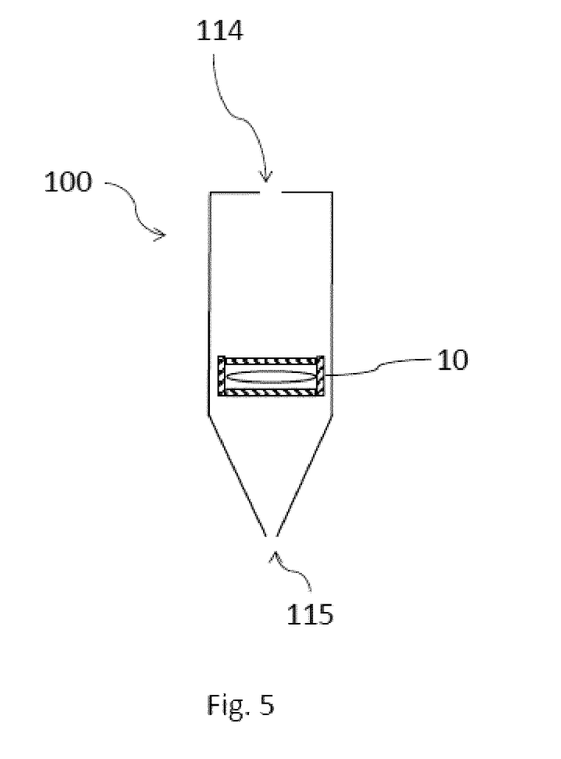
FIG. 5 schematically shows an example of a laser machining device 100 according to embodiments of the invention.

FIG. 5 schematically illustrates an example of a laser machining device 100 according to embodiments of the invention.

The laser machining device 100 is designed as a laser machining head. The laser machining head 100 has an interface 114 for a laser source for generating a machining laser beam and an outlet opening 115. The optical unit 10 shown in FIG. 1 is arranged between the interface 114 and the outlet opening 115.

Figure 6:
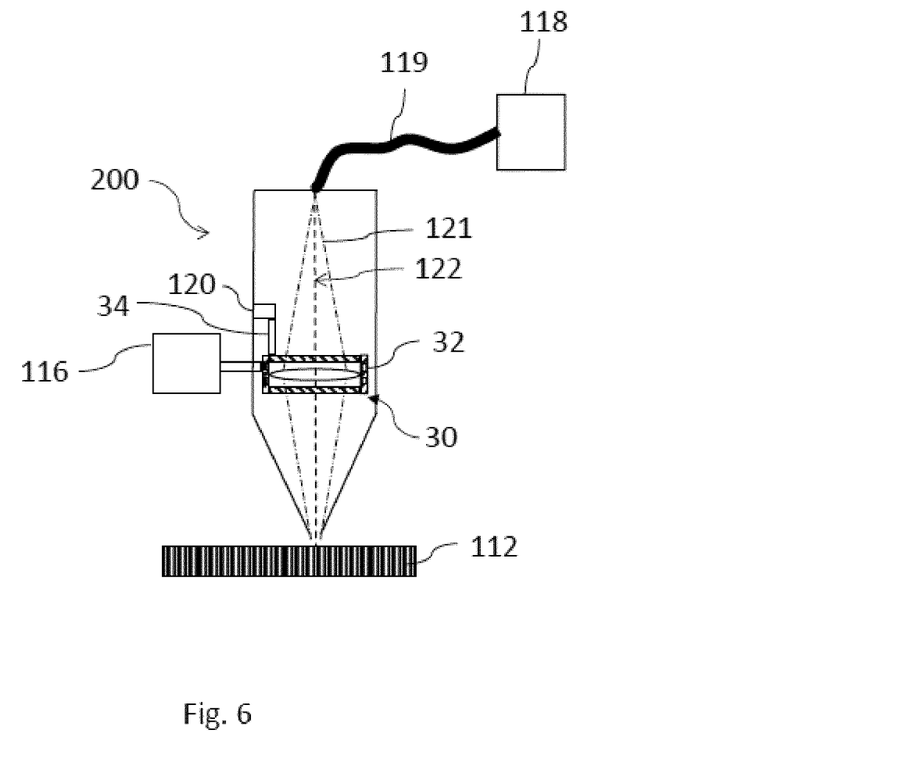
FIG. 6 schematically shows an example of a laser machining device 200 according to embodiments of the invention.

FIG. 6 schematically shows a machining device 200 as an example. The machining device 200 is designed as a machining head which, in contrast to the laser machining head 100 of FIG. 5, is equipped with the optical unit 30 of FIG. 4 instead of the optical unit 10. A laser source 118 is provided at the interface 114, for generating a laser beam 121, which is shown in FIG. 6 with dashed lines as a beam bundle with a direction of propagation 122. In the present example, a transport fibre 119 is provided for coupling the laser source 118. In alternative examples, the machining laser source 118 can be provided directly at the interface 114. In the present examples, the machining laser source 118 has a power of approximately 6 kW and generates the machining laser beam in a spectral range which includes a wavelength of 1070 nm. However, machining laser sources with a power lower than 6 kW, for example approximately 1 kW, or with a power greater than 6 kW can also be used.

The machining device 200 has a cooling device 116 which is connected to the cooling means, i.e. the cooling channels 32 of the optical unit 30, in a manner that conducts cooling fluid. The machining device is furthermore provided with a second means 120 for monitoring the thermal properties of the protective glass 14, which is arranged in the direction of the interface 114. The second means 120 is in turn connected to the thermal sensor 34, which is in contact with the relevant protective glass 14.

During operation of the machining device 200, the laser beam 121 is generated with the laser source 118. From the interface 114, the laser beam is directed in the direction of propagation 122 onto the optical unit 30. There the laser beam 121 passes the protective glass 14 arranged in the direction of the interface 114, is focused by the focusing lens 12, passes the protective glass 14 arranged in the direction of the outlet opening 115 and impinges through the outlet opening 115 on the workpiece 112 to be processed.

The airtight connection of the protective glasses 14 with the holder 16 and the clean room atmosphere in the interior space 18 of the optical unit 30 prevent contamination of the surfaces of the focusing lens 12. When the laser beam 121 passes the focusing lens 12, it is therefore not excessively heated by surface contamination. Damage to the focusing lens 12 and undesired changes in the imaging properties of the focusing lens 12 can therefore also be avoided in long-duration applications.

During operation of the machining device 200, cooling water is conducted through the cooling channels 32 of the holder 16 by means of the cooling device 116. In this way, the temperature of the holder 16 and thus of the entire optical unit 30 is kept at a desired level. At the same time, the temperature of the protective glass 14 is measured with the thermal sensor 34 and the second means 120 for monitoring the thermal properties of the protective glass. In this way, an undesired rise in the temperature of the protective glass 14 can be detected and a focus shift to be expected as a result can be counteracted, for example by changing the position of the optical unit in the beam path of the laser beam. As an alternative or in addition, an exchange of the optical unit that may be required can thus be displayed. In a modification of this example, the cooling device 116 is provided with a controllable valve for the cooling water and is connected in a data-processing manner by means of a controller to the second means 120 for monitoring the thermal properties of the protective glass 14. In this way, the temperature of the optical unit 30 can be controlled and, in particular, stabilised during the operation of the machining device 200.

In all examples and embodiments of the machining devices 100 and 200, additional transmissive optical elements (for example lenses) and/or additional reflective optical elements (for example plane mirrors) can be provided in particular in the machining head, for example for deflecting the machining laser beam 121. These additional optical elements can also be designed as optical units according to embodiments of the invention.

Finally, it should be noted that the description of the invention and the exemplary embodiments are not to be understood as limiting in terms of a particular physical implementation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining device for laser machining of workpieces can be produced so as to be distributed over several physical products.

The invention claimed is:

1. An optical unit for at least one of a laser beam and a high-power laser beam for laser machining of a workpiece, the optical unit comprising:
   an optical element configured to optically image the laser beam, and
   two protective glasses transparent to the laser beam, the two protective glasses comprising outer edges of which protective glasses are enclosed in an airtight manner by a holder such that with the holder they form an interior space, and
   wherein the optical element is arranged in the interior space;
   wherein the optical element comprises or is formed from at least one material selected from quartz glass and calcium fluoride; and
   wherein the protective glasses comprises or are formed from at least one material selected from sapphire and zinc sulfide.

2. The optical unit according to claim 1, wherein at least one of:
   the optical element comprises a thermal conductivity of less than or equal to 2 W/(m K); and
   at least one of the protective glasses comprises a thermal conductivity of greater than or equal to 10 W/(m K).

3. The optical unit according to claim 1, wherein at least one of a clean room atmosphere, an inert gas, a vacuum and a non-condensing atmosphere is provided in the interior space formed by the protective glasses and the holder.

4. The optical unit according to claim 1, wherein at least one of:
   the optical element is arranged between at least one of the protective glasses and in the beam path of the laser beam between the protective glasses;
   the optical element is arranged at least one of adjacent to and spaced apart from at least one of the protective glasses;
   the optical element and the protective glasses form a sandwich structure; and
   at least one of the optical element and the protective glasses are fastened or attached to the holder.

5. The optical unit according to claim 1, wherein at least one of:
   the protective glasses is a substantially plane-parallel plate;
   the protective glasses are arranged substantially parallel to one another; and
   the protective glasses and a plane of the optical element which is oriented at least one of perpendicular to an optical axis of the optical element and to a direction of propagation of the laser beam are arranged substantially parallel to one another are.

6. The optical unit according to claim 1, wherein at least ore of:
   the protective glasses are fastened or attached to the holder with at least one of an optical adhesive and a screw connection; and
   the optical element is fastened or attached to the holder with at least one of an optical adhesive and a screw connection.

7. The optical unit according to claim 1, wherein the holder is provided with cooling channels.

8. The optical unit according to claim 1, wherein at least one of:
   the optical element is configured to at least one of:
   be at least partially reflective of the laser beam,
   be at least partially transmissive for the laser beam,
   set a focal length for the laser beam,
   guide the laser beam,
   deflect the laser beam, and
   shape the laser beam; and
   at least one of the protective glasses is configured to not substantially change optical properties of the laser beam.

9. The optical unit according to claim 1, wherein:
   at least one of the optical unit and the holder are configured to tolerate at least one of a thermal expansion of at least one component of the optical unit and thermal expansion of at least one component in an airtight manner, and
   the component is selected from one or two of the protective glasses, the optical element, the holder, the optical adhesive, the screw connection, the cooling means, an atmosphere in the interior space and a gas in the interior space.

10. The optical unit according to claim 1, further comprising at least one first means for monitoring at least one of the optical, thermal and mechanical properties of at least one of the protective glasses and the optical element.

11. A laser machining device, in particular laser machining head, comprising an interface for a laser source for generating a laser beam; and an optical unit for at least one of a laser beam and a high-power laser beam for laser machining of a workpiece, comprising an optical element for the optical imaging of the laser beam, and two protective glasses that are transparent for the laser beam, the outer edges of which protective glasses are enclosed in an airtight manner by a holder in such a way that with the holder they form an interior space, wherein the optical element is arranged in the interior space; wherein the optical element contains or is formed from at least one material selected from quartz glass and calcium fluoride; and the protective glasses contain or are formed from at least one material selected from sapphire and zinc sulfide, wherein the optical unit is arranged in the beam path of the laser beam.

12. The laser machining device according to claim 11, wherein a at least one of:
   a cooling device is arranged coupled to the cooling channels of the holder; and the interface is coupled or provided with a laser source which provides the laser beam with a power greater than or equal to at least one of 6 kW and 10 kW.

13. The laser machining device according to claim 11, further comprising at least one second means for monitoring at least one of the optical, thermal and mechanical properties of at least one of the protective glasses and the optical element.

14. A use of an optical unit (10; 20; 30) according to claim 1, for at least one of laser machining and high laser machining a workpiece.

* * * * *